United States Patent [19]

Maloney

[11] Patent Number: 4,562,729

[45] Date of Patent: Jan. 7, 1986

[54] ELECTRIC CONTROL SIGNAL MONITORING AND SIMULATING APPARATUS FOR TROUBLESHOOTING AUTOMATIC TRANSMISSIONS

[76] Inventor: John G. Maloney, 1825 Leaning Pine Dr., Diamond Bar, Calif. 91765

[21] Appl. No.: 582,264

[22] Filed: Feb. 22, 1984

[51] Int. Cl.[4] .......................................... G01M 15/00
[52] U.S. Cl. .................................. 73/118; 73/432 SD
[58] Field of Search ........................ 73/118, 432 SD; 364/578; 324/72.5; 307/29, 36; 340/286 M, 825.06, 656, 515, 660; 339/31 T, 113 R, 150 B, 151 B

[56] References Cited

U.S. PATENT DOCUMENTS

| 3,295,096 | 12/1966 | Clayton et al. | 339/113 R X |
| 3,333,188 | 7/1967 | Eagle | 340/660 X |
| 4,084,869 | 4/1978 | Yen | 339/150 B X |
| 4,300,205 | 11/1981 | Tansuwan | 73/432 SD X |

FOREIGN PATENT DOCUMENTS 116236  7/1982  Japan ..................................... 73/118

Primary Examiner—Jerry W. Myracle
Attorney, Agent, or Firm—Gary Appel

[57] ABSTRACT

Electric control signal monitoring and simulating apparatus for use with electrically controlled automatic automobile transmissions comprises a control box having electrical leads and connectors which enable the control box to be connected in electrical series with preexisting electrical connections between an automatic transmission and the associated engine or accessory which provides electric control signals to the transmission. Lights and switches in the control box enable monitoring and/or modifying of the electric control signals to the transmission. Alternatively, the control box may be electrically connected to battery voltage, to ground, and to only the transmission, switches in the control box enabling the electric control signals normally provided to the transmission to be simulated, for example, to bench test the transmission.

10 Claims, 4 Drawing Figures

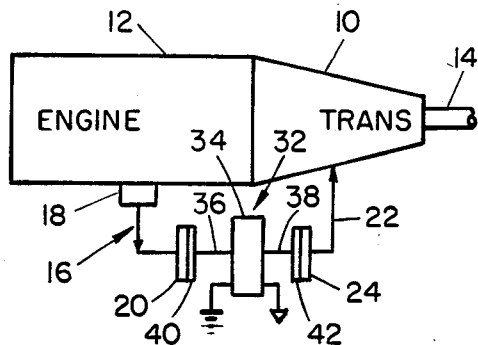
FIG. 1
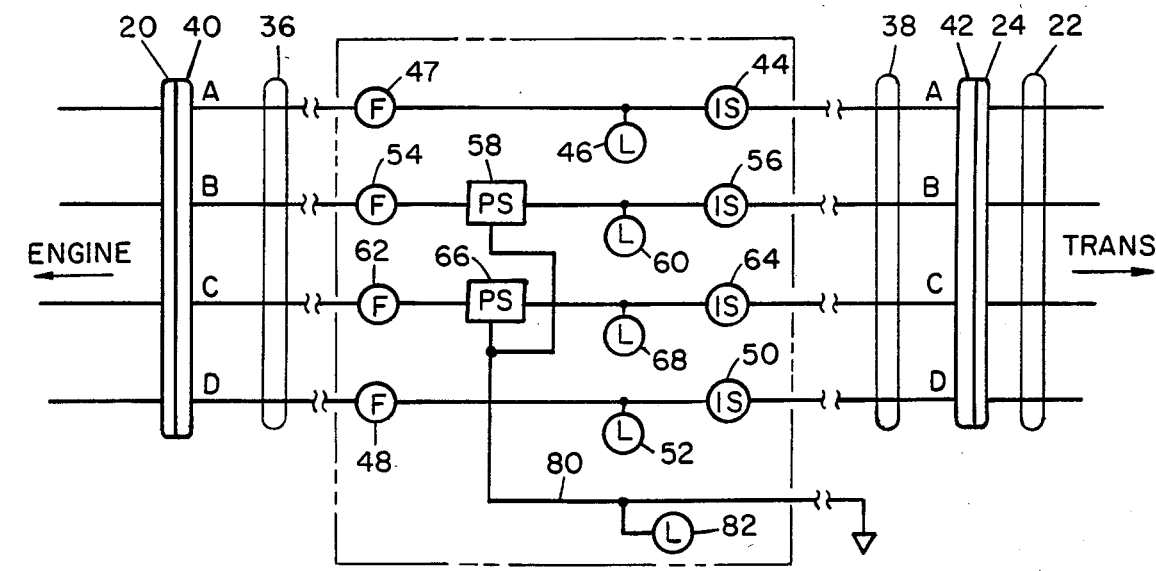
FIG. 2
FIG. 3

ELECTRIC CONTROL SIGNAL MONITORING AND SIMULATING APPARATUS FOR TROUBLESHOOTING AUTOMATIC TRANSMISSIONS

BACKGROUND OF THE INVENTION

1. Field of the Invention

The present invention relates generally to the field of automobile automatic transmissions and more particularly to test equipment used in association with such automatic transmissions.

2. Discussion of the Prior Art

A large percentage of modern automobiles are built with automatic transmissions. As is well known, such transmissions perform the important function of automatically shifting from one gear to another as the vehicle in which the transmission is installed accelerates or decelerates.

Although relatively simple in function, modern automatic transmissions are extremely complicated and complex pieces of machinery, so much so that, even in reliable automobiles, problems with automatic transmissions are not uncommon. As a result, during the life of an automobile, its automatic transmission may have to be adjusted a number of times so as to up-shift or down-shift properly and usually at least one complete overhaul of the automatic transmission is necessary.

In order to operate properly, automatic transmissions equipment typically receive, from the engine related signals which cause the transmission to shift at the correct vehicle speed, according to the rate of vehicle acceleration, shifting typically occurring at higher velocities when the vehicle is being rapidly accelerated than when the vehicle is accelerating in a normal manner.

A common malfunction of automatic transmissions is their failure to shift as they are supposed to, including shifting too soon, too late or erratically. When such transmission malfunctions occur, especially when the malfunction is of a sporadic type, the exact nature of the malfunction and its cause are very difficult to ascertain. For example, in many instances it is difficult to determine whether the transmission malfunction is caused by a defect in the transmission itself or by a defect in the automotive electrical system which provides control signals to the transmission from the engine.

Accordingly, an object of the present invention is to provide an electrical monitoring apparatus configured for connecting in the existing automotive electrical system between an automobile transmission and the associated engine and accessories so as to monitor the electrical signals provided to the transmission.

Another object of the present invention is to provide an electrical, simulator apparatus configured for connecting into the existing electrical signal input contacts of an electrically controlled automatic transmission so as to provide to the transmission known electrical operating signals in lieu of such signals being provided by the automobile engine and accessories.

Other objects, features and advantages of the present invention will be readily apparent from the following detailed description when taken in conjunction with the accompanying drawings.

SUMMARY OF THE INVENTION

According to the present invention, electric control signal monitoring and simulating apparatus, for use with an automobile automatic transmission which normally receives, through an electrical conduit, electric control signals from the engine or the like, comprises means for receiving and monitoring the electric control signals and means for connecting the receiving and monitoring means in electric series with the conduit through which the signals are provided to the transmission by the engine. The connecting means include means for mating with preexisting electrical connectors in the transmitting conduit.

The signal receiving and controlling means include means for selectively interrupting said control signals and also, preferably, for changing the level of the signals, for example, between normal signal voltage and ground. Also, the receiving and controlling means include means for simulating the control signals in the absence of the providing of the signals by the engine or the like. The simulating means include means for connecting the receiving and monitoring means to an automobile voltage supply or the like. Indicator lights are provided in the apparatus for monitoring the control signals.

BRIEF DESCRIPTION OF THE DRAWINGS

A better understanding of the present invention may be had from a consideration of the following detailed description, taken in conjunction with the accompanying drawings in which:

FIG. 1 is a general schematic drawing showing automobile engine and the associated automatic transmission, and electrical connections there between and also showing the signal monitoring/simulating apparatus, according to the present invention, connected into the electrical interconnection;

FIG. 2 is an electrical diagram of the signal monitoring/simulating apparatus of FIG. 1;

FIG. 3 is an electrical diagram of the monitoring/simulating apparatus as used in the monitoring mode.

DESCRIPTION OF THE PREFERRED EMBODIMENT

Figure 4:
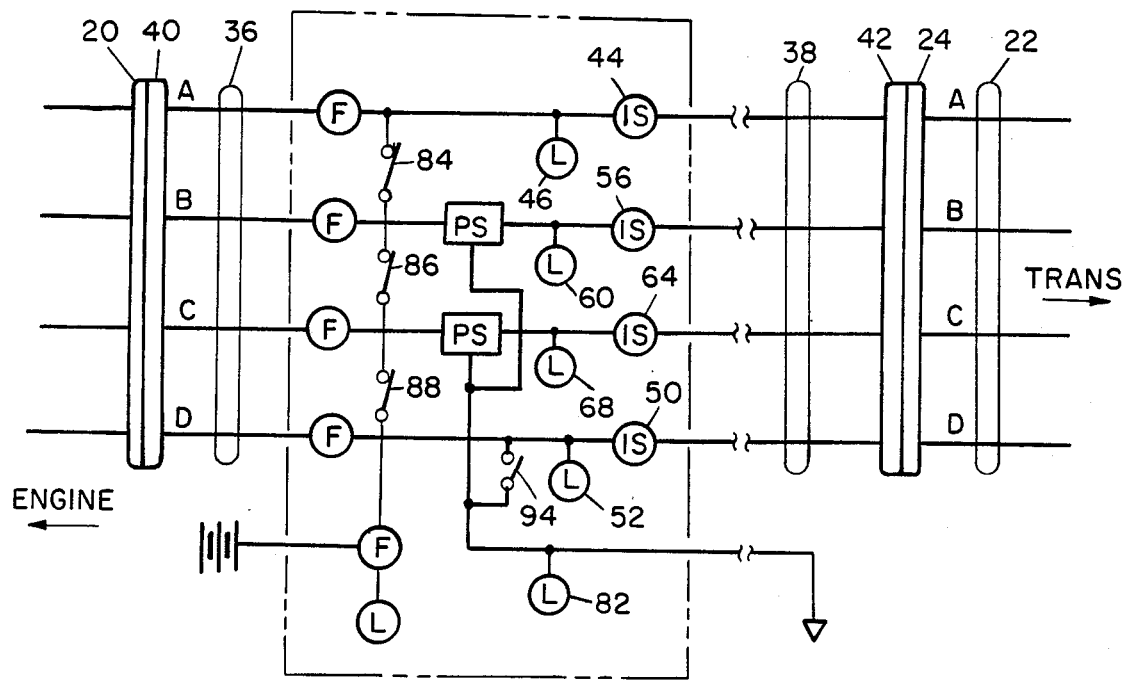
FIG. 4 is an electrical diagram of the monitoring/simulating apparatus as used in the simulating mode.

Shown in diagram form in FIG. 1 is an automatic transmission 10 which is connected, in a driven relationship, to an automobile engine 12. It is to be appreciated, however, that the term "automobile engine" is to be broadly construed so as to include trucks engines and any other type of engines which are connected to power train 14 through an automatic transmission.

One end of a preexisting electric conduit or cable 16 is connected to means 18 on engine 12 which provide electric signals for controlling transmission 10 or parts thereof. For example, in some General Motors automobiles, the electric signals may be provided for operating in transmission 10 the solenoid that electrically controls the torque converter clutch (TCC) so as to cause it to be applied and released. As an additional example, in some Toyota and BMW automobiles, the electrical signals open and close the shifting solenoids in addition to operating the apply and release of the torque converter clutch.

Typically, existing conduit 16 is part of the automobile wiring harness (now shown) and usually comprises one or more electrical wires, four being described herein for illustrative purposes. Conduit 16 ordinarily terminates in a connector or connector blocks 20. Signal generating means 18 can be considered part of engine 12 as defined herein; although, as can be understood, means 18 may obtain signals from various parts of the engine, including the carburetor, electronic control module, according to the particular make and type of vehicle involved.

Connected at one end to transmission 10 is a preexisting electric conduit or cable 22 which terminates in a connector or connector block 24. Conduit 22 is also a part of the automobile wiring harness. Connectors 20 and 24 are of the mating, male and female type so that in the factory assembly, the connectors interconnect conduits 16 and 22 to enable electric control signals to be transmitted from means 18 (that is, from engine 12 or the like) through the conduits to transmission 10. Within transmission 10, the electrical wires forming conduit 22 are connected to such electrical control parts as the above mentioned TCC solenoid and shifting solenoids (not shown), according to the make and type of transmission involved.

Connected in electrical series with electrical conduits 16 and 22 are control signal monitoring and simulating apparatus 32, according to the present invention. For purposes described below, apparatus 32 is also connected to +12 volts (vehicle voltage) and vehicle ground.

As shown in FIG. 2, apparatus 32 comprises a control box 34, a four wire input conduit or cable 36, and a four wire output conduit or cable 38. Input cable 36 terminates in a connector or connector block 40 which is configured to mate with existing cable connector 20 and output cable 38 terminates in a connector or connector block 42 which is configured to mate with existing cable connector 24. Accordingly, apparatus 32 is connected in electrical series with control signal conduits 16 and 22 so that transmission control signals from means 18 to transmission 10 pass through control box 34.

By way of example, with no limitations intended, input conduit 36 is shown to consists of four wires designated "A", "B", "C", and "D", as is output conduit 38. Within box 34, wire "A" has connected in electrical series therewith a first fuse 47 and a first interrupt switch 44. A first light 46 is connected in parallel with wire "A" to light when an electric signal is on wire "A". Similarly, wire "D" has a second fuse 48 and a second interrupt switch 50 in series therewith and a second indicator light 52 in parallel therewith. Wire "B" has a third fuse 54, a third interrupt switch 56 and a first polarity or level changing switch 58 in series therewith and a third indicator light 60 in parallel therewith. In a like manner, wire "C" has in series therewith a fourth fuse 62, a fourth interrupt switch 64 and a second polarity or level switch 66; connected in parallel with "C" is a fourth indicator light 68.

Polarity switches 58 and 66 are connected to ground through wire 80 which has a fifth indicator light 82 in parallel therewith. Wires "A", "B", and "C" are connected through respective normally open switches 84, 86 and 88 in a wire 90 to normally connected +12 volts (vehicle voltage). A sixth indicator light 92 is in parallel with wire 90. An additional normally open switch 94 enables wire "D" to be grounded through wire 80. For convenience, switches 84,86,88, and 94 may be ganged together so as to operate in unison, for purposes which will be evident from the ensuing description.

Apparatus 32, when constructed in the above-described manner, can be configured to operate in either of two different modes. The first operational mode, depicted in FIG. 3, is a signal monitoring mode and the second operational mode, depicted in FIG. 4, is a signal simulating mode.

In the signal monitoring mode of FIG. 3, input conduit 36 is connected to engine conduit 16 (at connectors 20 and 40) and output conduit 38 is connected to transmission conduit 22 (at connectors 42 and 24). Indicator lights 46,60,68 and 52, in parallel with respective wires "A", "B", "C" and "D", then indicate when lit, the presence of electric control signals from means 18 to transmission 10, on such wires. Respective interrupt switches 44, 56, 64 and 50 enable an operator to interrupt control signals on wires "A", "B", "C" and "D", thereby enabling an operator or mechanic to check the response of transmission 10 to the presence and absence of control signals on selected ones of wires "A" through "D". In that way, a transmission can be diagnosed as being or not being responsive to its electric contro. signals from means 18. Polarity switches 58 and 66 in wires B and C enable an operator to switch between the control signal and ground. That is, wires B and C in transmission conduit 22 can be allowed to receive control signals from means 18 or to be grounded. Light 82 indicates when the ploarity switch 58 or 60 is grounded. Fuses 47, 54, 62 and 48 protect wires "A" through "D" from overloads.

In the signal simulating made of operation (FIG. 4), input conduit 36 is disconnected from engine conduit 16 so that transmission 10 receives no control signals generated by means 18. Wires "A", "B" and "C" are, then connected to +12 volts by the closing of switches 84, 86 and 88, respectively. Wire "D" is shown connected to ground by the closing of switch 94. As a result, a +12 volt control signal can be applied to transmission wires "A", "B" or "C" through switches 44, 56 or 64. As for the monitoring mode, described above, wires "B" or "C" can be grounded at the transmission side through polarity switches 58 or 66. Lights 46,60 and 68 indicate the presence of self-generated signals on wires "A", "B" or "C". In the simulating mode, transmission 10 can be by apparatus 32 independently of signals from means 18 and, therefore, the simulating mode of operation is very useful for bench testing of transmission 10.

It is to be understood that the particular arrangements of the various switches and lights described above for box 34, as well as the number of wires used are by way of example only. Specific configuration, including the number of wires used in apparatus 32 depend upon the particular make and type of transmission involved. Ordinarily a specific configuration of apparatus 32 would be used for each different type of transmission, according to the number of wires involved, whether particular wires receive control signals and which wires are to be grounded, thus, for some vehicle types, only two wires, a +12 volt signal wire and a ground wire (for example, wires "A" and "D") would be used. Such variations are, of course, within the skill of those trained in automobile transmission troubleshooting and repairs.

In many instances it may be more preferred to construct and use separate monitoring and simulating apparatus (depicted in FIGS. 3 and 4), rather than incorporating provision for both mode of operation in a single unit, as hereinabove described. Use of such separate apparatus is, however, considered to fall within the scope of the present invention.

Although there has been described above a specific arrangement of a combination signal monitor and signal simulator for use in checking out malfunctions in automobile automatic transmissions in accordance with the present invention for purposes of illustrating the manner in which the invention may be used to adbantage, it will be appreciated that the invention is not limited thereto. Accordingly any and all modifications, variations as equivalent arrangements which may occur to those skilled in the art should be considered to be within the scope of the invention as defined in the appended claims.

What is claimed is:

1. Electric control signal monitoring apparatus for use with an automobile automatic transmission which normally receives, through a preexisting electrical conduit, electric control signals from the automobile engine and its controls or the like; said apparatus comprising:
   (a) means for receiving and monitoring said electric control signals provided to an automatic transmission by said engine and its controls or the like; and
   (b) means for connecting said receiving and monitoring means in electrical series with said preexisting electrical conduit through which the electric control signals are provided to the transmission so as to enable said receiving and monitoring means to monitor said control signals passing therethrough.

2. The apparatus as claimed in claim 1 wherein said connecting means include means for mating with preexisting electrical connectors in said preexisting electrical conduit.

3. The apparatus as claimed in claim 1, wherein said receiving and monitoring means include means for selectively interrupting said electric control signals so as to simulate an electrical system malfunction.

4. The apparatus as claimed in claim 1 wherein said receiving and monitoring means include means for changing the level of said electric control signals from the normally applied voltage to ground.

5. The apparatus as claimed in claim 1 wherein said receiving and monitoring means include means for simulating said electric control signals for controlling the automatic transmission in the absence of the providing of said signals from the engine and its controls or the like.

6. The apparatus as claimed in claim 5 wherein said simulating means include means for connecting the receiving and monitoring means to an automobile voltage supply or the like and to ground.

7. Electrical signal monitoring and simulating apparatus for use with an automobile automatic transmission which normally receives, through a preexisting electrical conduit electric control signals from an automobile engine and its controls or the like, said apparatus comprising:
   (a) first means for receiving and monitoring said electric signals provided to an automatic transmission by said automobile engine and its controls or the like;
   (b) second means for simulating said electric control signals;
   (c) connecting means for selectively connecting said first means in electrical series with said preexisting electrical conduit so as to enable said first means to monitor said control signals passing therethrough to said transmission and for selectively connecting said second means in electrical series between a voltage supply and said transmission so as to enable the providing of simulated control signals to said transmission.

8. The apparatus according to claim 7 wherein said first and second means include a plurality of signal interruption switches which are common to both of said means thereby enabling the control signals provided to the transmission to be selectively interrupted.

9. The apparatus according to claim 7 wherein said first and second means include a plurality of voltage level changing switches which are common to both of said means, thereby enabling the voltage level of the central signals provided to the transmission to be selectively changed.

10. The apparatus according to claim 7 wherein said first and second means include a plurality of signal indicating lights connected for being lit when said electric control signals are provided to the transmission.

* * * * *